(12) United States Patent
Komori et al.

(10) Patent No.: US 8,040,637 B2
(45) Date of Patent: Oct. 18, 2011

(54) DRIVE WITH VOICE COIL MOTOR

(75) Inventors: Noriyuki Komori, Tokyo (JP); Atsushi Michimori, Tokyo (JP); Shinji Yagyu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 526 days.

(21) Appl. No.: 12/232,538

(22) Filed: Sep. 18, 2008

(65) Prior Publication Data

US 2009/0097164 A1    Apr. 16, 2009

(30) Foreign Application Priority Data

Sep. 21, 2007   (JP) ................... 2007-244706

(51) Int. Cl.
*G11B 21/08* (2006.01)
(52) U.S. Cl. .................................... 360/264.7
(58) Field of Classification Search ............... 360/264.7
See application file for complete search history.

(56) References Cited

U.S. PATENT DOCUMENTS

2005/0162782 A1*  7/2005  Tsuda et al. ............... 360/264.7
2006/0132982 A1*  6/2006  Tanizawa et al. .......... 360/265.7
2009/0109576 A1*  4/2009  Kuwajima ................. 360/294.5

FOREIGN PATENT DOCUMENTS

| JP | 03250471 A | * 11/1991 |
|---|---|---|
| JP | 5-326603 A | 12/1993 |
| JP | 8-70406 A | 3/1996 |
| JP | 8-221912 A | 8/1996 |
| JP | 2006-271052 A | 10/2006 |
| JP | 2008-15452 A | 1/2008 |
| JP | 2008-26504 A | 2/2008 |

* cited by examiner

*Primary Examiner* — Mark Blouin
(74) *Attorney, Agent, or Firm* — Birch, Stewart, Kolasch & Birch, LLP.

(57) ABSTRACT

A drive is provided executing high-speed oscillatory motion. A voice coil motor in a pixel shifter includes a coil of a rectangular shape producing thrust along an axis, a flap fixing the coil, and flat springs giving to the flap an urging force against the thrust. An oscillation axis of the flap is parallel to the axis and located between another axis that is parallel and opposite to the axis and still another axis that is parallel to the axis and passes over a centroid of the coil. This reduces the value of the inertia per unit torque.

2 Claims, 5 Drawing Sheets

F I G . 1
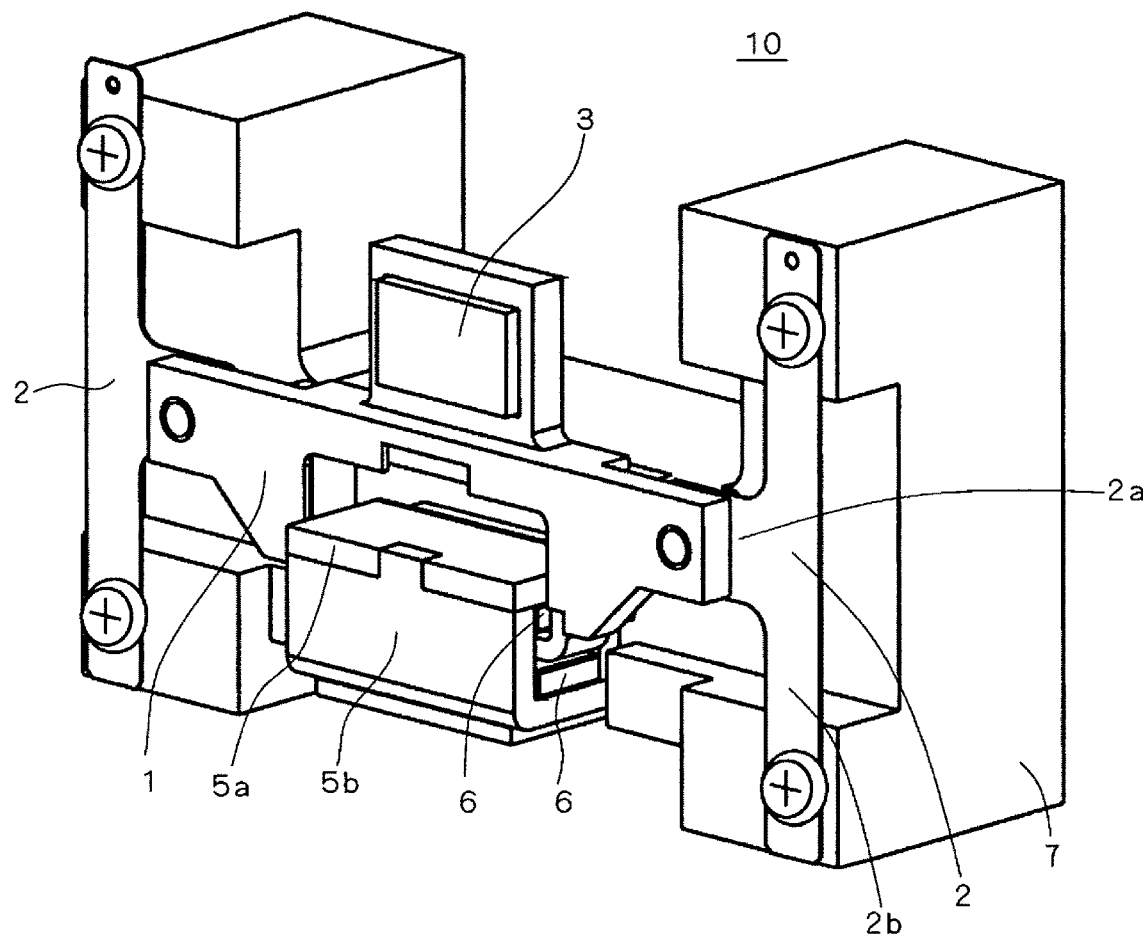

F I G . 2
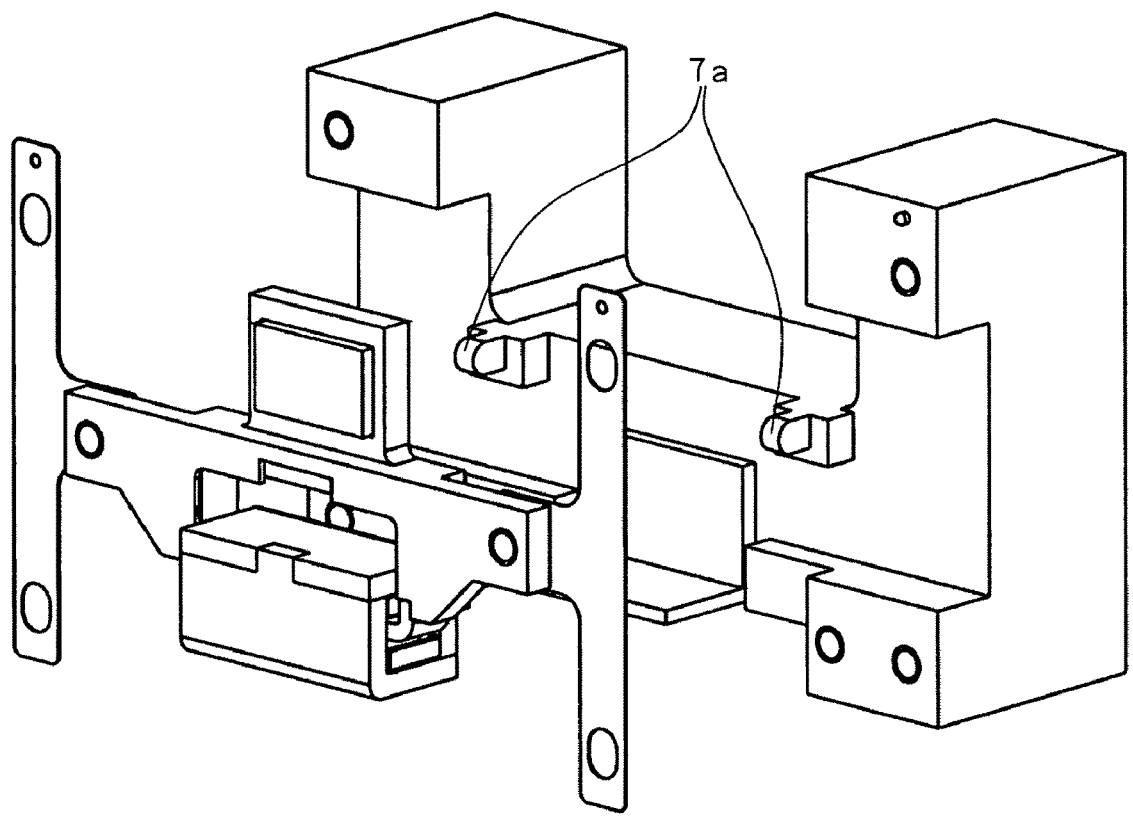

F I G . 3
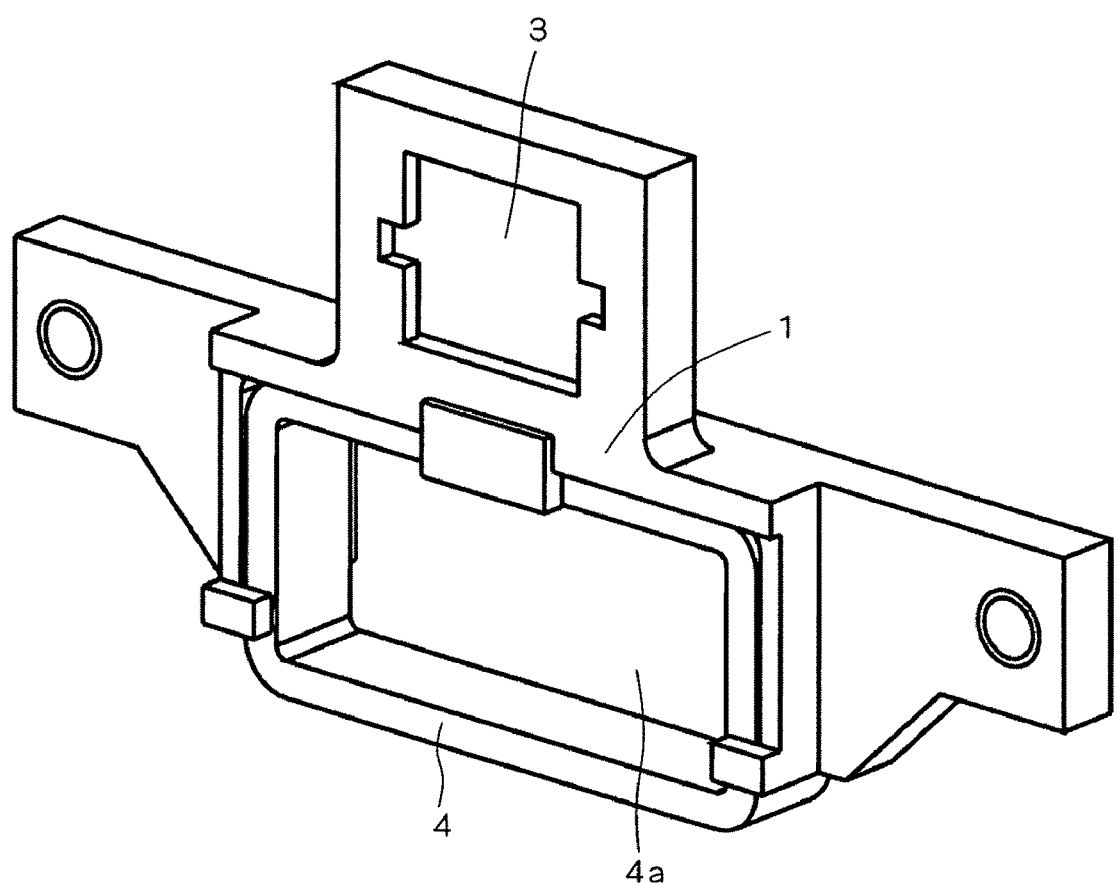

DRIVE WITH VOICE COIL MOTOR

BACKGROUND OF THE INVENTION

1. Field of the Invention

The present invention relates to a drive with a voice coil motor that executes oscillatory motion.

2. Description of the Background Art

Recent projection image displays that project images on a screen by light projection employ a device (hereinafter referred to as a "pixel shifter") that allows incident light to pass through glass so that the glass oscillates slightly, thereby shifting the incident light in the direction of oscillation. Shifting an image on a screen by half a pixel with this pixel shifter has the effect of increasing the apparent number of pixels, thereby improving resolution.

The actuator used in this case is a voice coil motor that includes a cylindrical coil, a cup-shaped outer yoke provided to cover the outer side of the coil, a permanent magnet provided at the center of the inner face of the outer yoke and on the inner side of the coil, and an inner yoke provided at the top end of the permanent magnet.

The device that executes oscillatory motion is also a cylindrical voice coil motor. Its center of oscillation is located outside the voice coil motor and at about the midpoint position between a position where the oscillatory motion occurs and the voice-coil motor.

Examples of an apparatus using a voice coil motor as an actuator are disclosed for example in Japanese Patent Application Laid-open No. 5-326603 (cf. paragraph [0002] and FIG. 1) and the like.

A cylindrical voice coil motor generates a thrust throughout the periphery of a coil, thus achieving efficiency; however, it has the problem of difficulty in machining parts such as a cup-shaped yoke. Thus, in some cases, a voice coil motor of a different shape is used in which a yoke (center yoke) of a metal plate is provided in a hole at the center of a rectangularly-wound coil, and one magnet is provided in a position to sandwich one side of the coil. In this case, an end face of another yoke (back yoke) provided at the rear of the magnet and an end face of the center yoke provided in a hole at the center of the coil are made in contact with each other, which provides a structure that allows the magnetic flux from the magnet to circulate, thus improving the efficiency of the voice coil motor.

When the aforementioned voice coil motor with a rectangularly-wound coil is adopted, one side of the coil that is the furthest away from the center of oscillation is used as a voice coil motor in order to increase torque. As the one side of the coil used as a voice coil motor is further away from the center of oscillation, higher torque can be obtained with only a small thrust.

However, since a coil is mainly made of copper and thus concerned as one of the oscillating parts of relatively high mass, its increased distance from the center of oscillation will undesirably increase the inertia of the coil, making it difficult to increase the speed of oscillation.

SUMMARY OF THE INVENTION

The invention has been made in view of the aforementioned problems and has the object of providing a drive that executes high-speed oscillatory motion.

The drive according to the invention includes a voice coil motor. The voice coil motor includes a coil of a rectangular shape producing thrust on its one side; an oscillating part fixing the coil; and an elastic body giving to the oscillating part an urging force against the thrust. An oscillation axis, which is the center of oscillation of the oscillating part, is parallel to the one side and located between a coil face outside another side that is parallel and opposite to the one side, and a centroid axis that is parallel to the one side and passes over a centroid of the coil.

The drive according to the invention reduces the value of the inertia per unit torque and accordingly lessens the influence of the inertia of the coil, thus executing high-speed oscillatory motion.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an external perspective view illustrating the structure of a pixel shifter according to a first preferred embodiment;

FIG. 2 is an exploded perspective view illustrating the structure of the pixel shifter according to the first preferred embodiment;

FIG. 3 is an external perspective view illustrating the structure of oscillating parts of the pixel shifter according to the first preferred embodiment;

DESCRIPTION OF THE PREFERRED EMBODIMENTS

Figure 4:
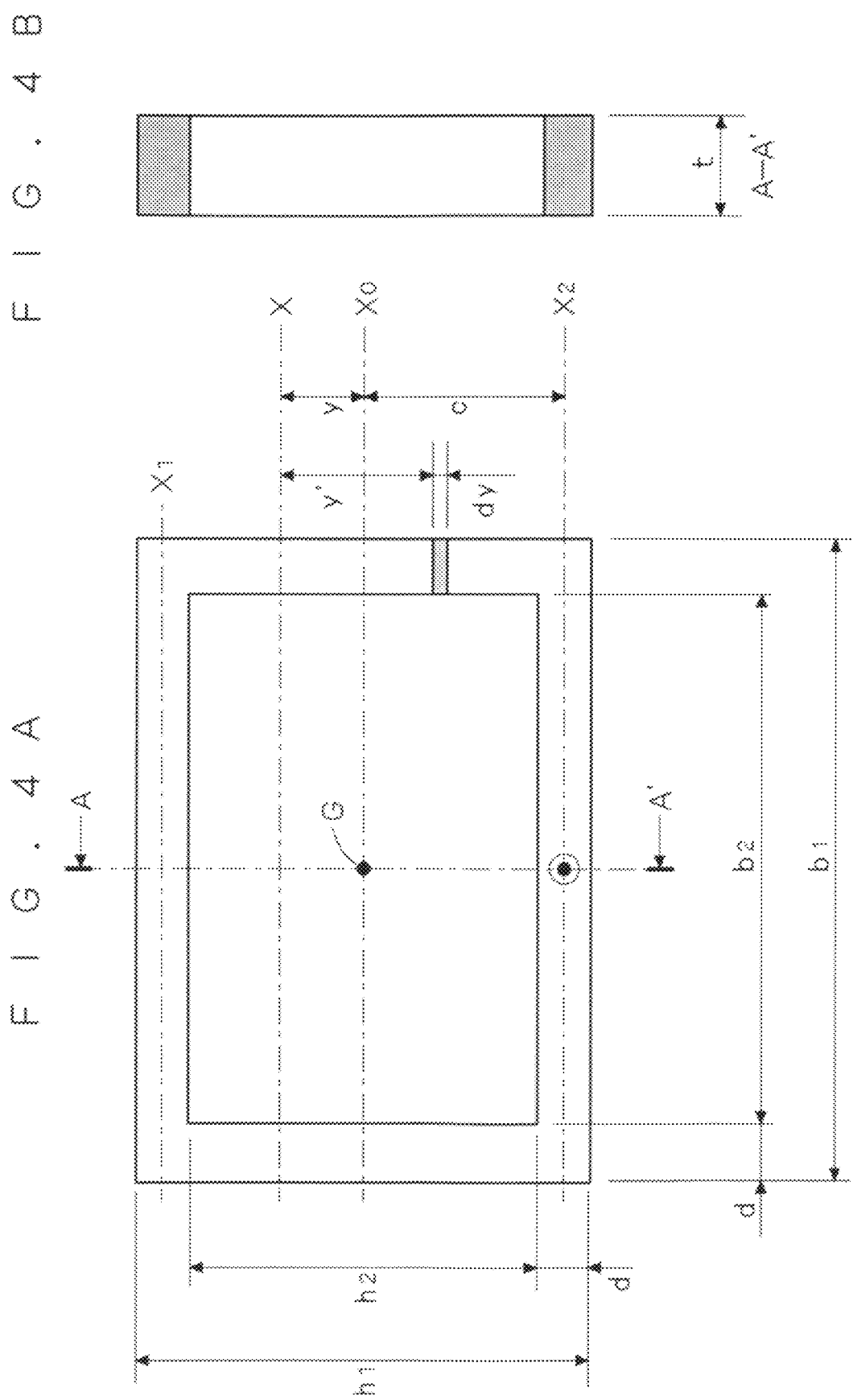
FIGS. 4A and 4B illustrate the relationship between a coil and the center of oscillation in the pixel shifter according to the first preferred embodiment.

Now, preferred embodiments of a drive according to the invention are described with reference to the drawings.

First Preferred Embodiment

FIG. 1 is an external perspective view illustrating the structure of a pixel shifter 10 according to a first preferred embodiment of the invention, FIG. 2 is an exploded perspective view thereof, and FIG. 3 is an external perspective view of oscillating parts.

Referring to FIGS. 1 to 3, a flap 1 as an oscillating part has attached thereto glass 3 passing through incident light, a rectangular coil 4 as a component of a voice coil motor, and flat springs 2 generating a reaction force against the thrust of the voice coil motor. The T-shaped flat springs 2 are fixed at the center of oscillation of the flap 1 and give an urging force so that the flap 1 abuts against supporting points 7a provided on a base 7. The glass 3 is provided on the opposite side to the coil 4 across the axis of oscillation. The oscillatory motion of the flap 1 causes the flat springs 2 to generate a reaction force due to torsion at their portions 2a and a reaction force due to deformation at their portions 2b.

The voice coil motor includes the coil 4 fixed to the flap 1, an L-shaped yoke 5a passing through a hole 4a that opens at the center of the coil 4, a yoke 5b provided outside the coil 4, and two magnets 6 attached to the inner faces of the yokes 5a and 5b to sandwich the coil 4. The L-shaped yokes 5a and 5b are made in contact with each other at their end faces so that the magnetic lines of force from the north pole of the magnets 6 are circulated to the south pole.

Passing current through the coil 4 produces a thrust in the direction perpendicular to the magnetic lines of force passing in the vertical direction of the drawing across the coil 4. This thrust causes the flap 1 to oscillate on the supporting points 7a against the spring force of the flat springs 2.

The parts fixed to and oscillating along with the flap 1 are the glass 3 and the coil 4. Referring to the mass of each part, for example the flap 1 has a mass of 1.5 g, the glass 3 has a mass of 0.7 g, and the coil 4 has a mass of 2.1 g, which indicates that the mass of the coil 4 constitutes about half the total mass of the oscillating parts. This apparently shows that reducing the inertia of the coil 4 is important for improvement in the response characteristics of the pixel shifter 10.

FIGS. 4A and 4B illustrate the relationship of the coil 4 and the center of oscillation. FIG. 4A is a front view of the coil 4 and FIG. 4B is a cross-sectional view of the coil 4. The shape of the coil 4 is expressed by the external width $b_1$, external height $h_1$, internal width $b_2$, and internal height $h_2$ of the coil 4. Let X be the center of oscillation, i.e., the oscillation axis; $X_0$ be the axis (centroid axis) parallel to the oscillation axis X and passing over the centroid G; c be the distance between the axis $X_0$ and an axis $X_2$ that passes over the center of the part of the coil 4 where the thrust is produced; d be the thickness of the coil 4; t be the depth of the coil 4; and ρ be the mass of the coil 4 per unit volume.

The inertia I of the coil 4 is expressed by the square of the product of the mass of each tiny part of the coil 4 and the distance thereof from the center of oscillation.

The mass of each tiny part dy of the coil 4 is given by the following equation (1).

$$dM = \rho \cdot t \cdot dy \cdot d \qquad (1)$$

The inertia I of a tiny part dy in the drawing is thus given by the following equation (2), using the distance y' between the tiny part dy and the oscillation axis X.

$$I = \rho \cdot t \cdot dy \cdot d \cdot y'^2 \qquad (2)$$

By substituting each parameter shown in FIGS. 4A and 4B into equation (2) and using a well-known formula for calculation of the geometrical moment of inertia, the inertia I of the coil 4 with the oscillation axis X as the center is given by the following equation (3), using the distance y between the axis $X_0$ and the oscillation axis X.

$$I = \rho \cdot t (b_1 \cdot h_1 - b_2 \cdot h_2) y^2 + \rho \cdot t (b_1 \cdot h_1^3 - b_2 \cdot h_2^3)/12 \qquad (3)$$

When thrust F is produced on the bottom side of the coil 4, the torque T having the oscillation axis X as its center is given by the following equation (4).

$$T = F \cdot (y+c) \qquad (4)$$

Since the inertia J per unit torque T is given by J=I/T, combining the previous two equations (3) and (4) yields the following equation (5).

$$J = \rho \cdot t(b_1 \cdot h_1 - b_2 \cdot h_2)y^2/F(y+c) + \rho \cdot t(b_1 \cdot h_1^3 - b_2 \cdot h_2^3)/12F(y+c) \qquad (5)$$

Figure 5:
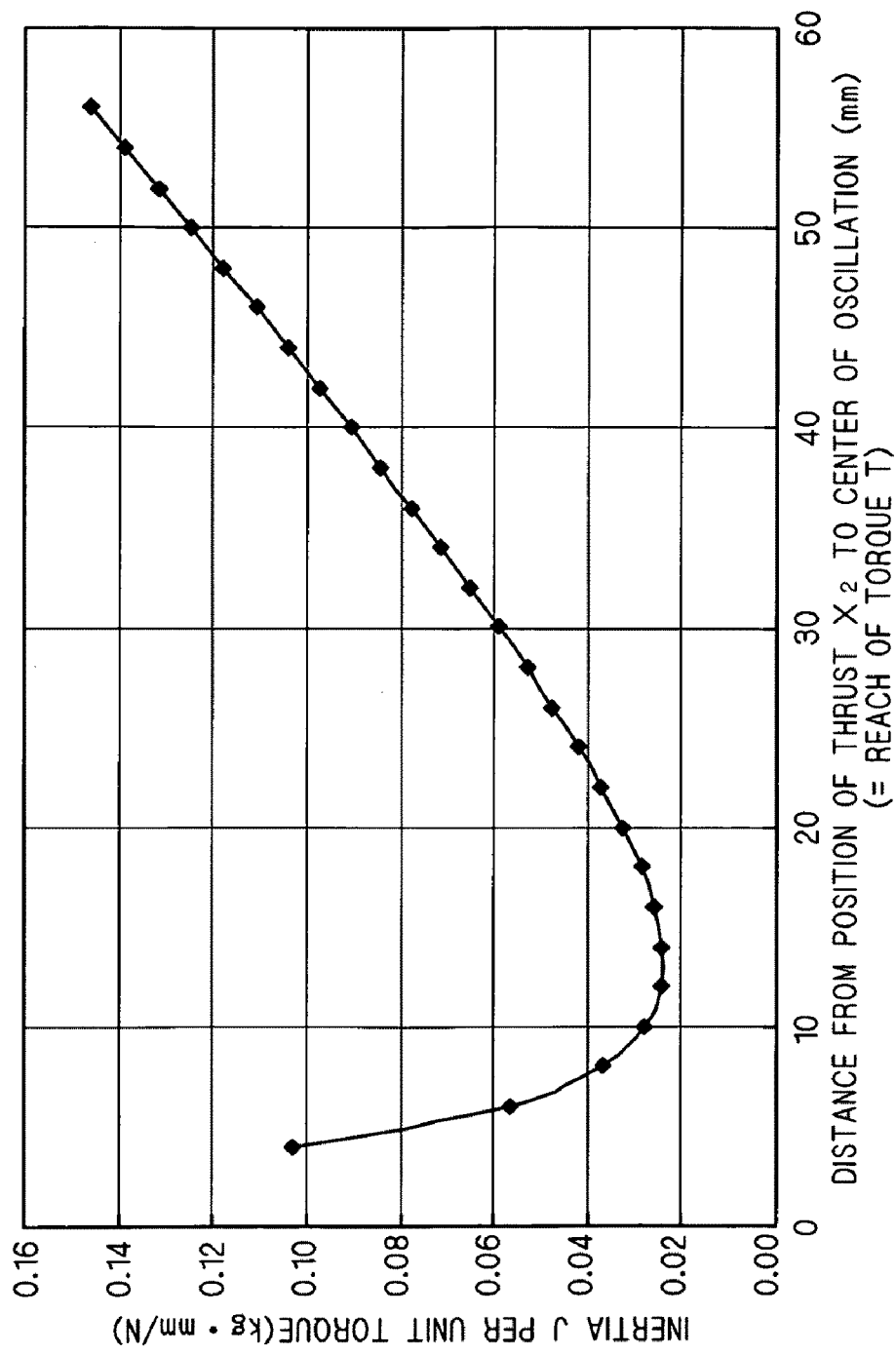
FIG. 5 is a graph showing the relationship between the distance from a position where the coil produces thrust to the center of oscillation and the inertia per unit torque in the pixel shifter according to the first preferred embodiment.

Substituting, for example, $b_1$=25 mm, $b_2$=22 mm, $h_1$=22 mm, $h_2$=18 mm, t=5 mm, c=10 mm, ρ=4.84·10$^{-6}$ kg/mm$^3$, and F=1N into the above equation (5) yields a graph as shown in FIG. 5.

It can be seen from FIG. 5 that, when the center of oscillation, i.e., the oscillation axis X, is located on the outer side of the axis $X_1$ in FIG. 4A outside the coil 4 (on the upper side in FIG. 4A) (the position where X=$(h_1+h_2)$/2=20 in FIG. 5), the value of J increases linearly. In other words, when the oscillation axis X is located inside the coil 4, some parts of the coil 4 have long reaches and others have short reaches. For example when the reach from the oscillation axis X to the axis $X_2$ is long, the reach from the oscillation axis X to the axis $X_1$ is short. This results in an increase in the inertia of one side of the coil 4 along the axis $X_2$ and a decrease in the inertia of the other side of the coil 4 along the axis $X_1$. However, if the oscillation axis X is located outside the coil 4, all parts of the coil 4 have long reaches so that the amount of the increase in inertia is greater than in the case where the oscillation axis X is located inside the coil 4. It can also be seen that the value of J increases steeply when the center of oscillation, i.e., the oscillation axis X, is located closer to the position where the thrust is produced (or the position of thrust) (which corresponds to the lower part in FIG. 4A and where X=0=$X_2$ in FIG. 5) than the axis $X_0$ in FIG. 4A (which corresponds to where X=$X_1$/2=10 in FIG. 5).

From the above, it is concluded that locating the oscillation axis X of the coil 4 between the axes $X_0$ and $X_1$ in FIG. 4A helps reduce the value of the inertia per unit torque and accordingly lessen the influence of the inertia of the coil 4, thereby providing an oscillating part that executes high-speed oscillatory motion.

As described so far, the voice coil motor in the pixel shifter 10 (drive) according to the present preferred embodiment includes the rectangular coil 4 producing thrust along the axis $X_2$ (on its one side), a flap 1 (oscillating part) fixing the coil 4, and the flat springs 2 (elastic bodies) giving to the flap 1 an urging force against the thrust, wherein the oscillation axis X (the center of oscillation) of the oscillating part is parallel to the axis $X_2$ and located between the coil face outside the axis $X_1$ (another side) that is parallel and opposite to the axis $X_2$, and the axis $X_0$ (centroid axis) that is parallel to the axis $X_2$ and passes over the centroid of the coil 4. This achieves high-speed oscillatory motion.

Second Preferred Embodiment

The pixel shifter 10 according to the first preferred embodiment can reduce the inertia J per unit torque by locating the center of oscillation, i.e., the oscillation axis X, between the axes $X_0$ and $X_1$ in FIG. 4A. A second preferred embodiment defines an optimal range of the location of the center of oscillation, i.e., the oscillation axis X, by determining the range of the location of an oscillation axis $X_{min}$ that exhibits a minimum value of the inertia J per unit torque.

The description is given with reference to FIGS. 4A and 4B shown in the first preferred embodiment. Like or corresponding components to those in the first preferred embodiment are denoted by the same reference numerals or characters as used in the first preferred embodiment, the description of which is thus omitted herein.

First, equation (5) given in the first preferred embodiment is differentiated with respect to y, in which case the values A and B defined by the following equations (6) and (7), respectively, shall be used for the sake of simplification.

$$A = \rho \cdot t(b_1 \cdot h_1 - b_2 \cdot h_2)/F \qquad (6)$$

$$B = \rho \cdot t(b_1 \cdot h_1^3 - b_2 \cdot h_2^3)/12F \qquad (7)$$

The differentiation of equation (5) with respect to y is thus expressed by equation (8), using the values A and B.

$$dJ/dy = 2A \cdot y(y+c)^{-1} - A \cdot y^2(y+c)^{-2} - B(y+c)^{-2} \qquad (8)$$

See the inertia J per unit torque attains its minimum value when dj/dy=0, both sides of equation (8) is multiplied by $(y+c)^2$, where dj/dy=0. This derives equation (9).

$$y^2 + 2c \cdot y - B/A = 0 \quad (9)$$

From equation (9), the value y is given by equation (10).

$$y = (1/2) \cdot (-2c \pm \sqrt{4c^2 + 4B/A}) \quad (10)$$

The distance c between the axes $X_0$ and $X_2$ in equation (10) is given by equation (11), using the external height $h_1$ and the internal height $h_2$.

$$c = (h_1 + h_2)/4 \quad (11)$$

Substituting the value A given by equation (6), the value B given by equation (7), and the distance c given by equation (11) into equation (10) derives the following equation (12).

$$y = -(h_1 + h_2)/4 \pm \sqrt{(h_1+h_2)^2/16 + (b_1 \cdot h_1^3 - b_2 \cdot h_2^3)/(12 \cdot (b_1 \cdot h_1 - b_2 \cdot h_2))} \quad (12)$$

Now, from equation (11), the ratio Y of y to c (i.e., Y=y/c) is given by equation (13).

$$Y = y/((h_1 + h_2)/4) \quad (13)$$

By substituting equation (13) into equation (12), the ratio Y can be expressed by the following equation (14).

$$Y = -1 \pm \sqrt{1 + (4(b_1 \cdot h_1^3 - b_2 \cdot h_2^3)/(3(h_1 + h_2)^2 (b_1 \cdot h_1 - b_2 \cdot h_2)))} \quad (14)$$

If $((b_1 \cdot h_1^3 - b_2 \cdot h_2^3)/(h_1 + h_2)^2 (b_1 \cdot h_1 - b_2 \cdot h_2)) = Z$ in the above equation (14), Y=0 when Z=0. Assuming that $Z \leq 1$, when Z=1, the maximum value of Y is $Y = -1 + \sqrt{1+4/3} \approx 0.53$ (more precisely, less than 0.53). Whether this assumption is correct or not is now discussed.

Referring to the value Z, since $(h_1+h_2)^2 > 0$ and $b_1 \cdot h_1 - b_2 \cdot h_2 > 0$, deforming the expression giving the value Z with the assumption that $Z \leq 1$, we obtain the following inequality (15).

$$b_1 \cdot h_1^3 - b_2 \cdot h_2^3 \leq (b_1 \cdot h_1 - b_2 \cdot h_2) \cdot (h_1 + h_2)^2 \quad (15)$$

Further deformation of inequality (15) derives the following inequality (16).

$$0 \leq h_1 \cdot h_2 ((h_1 + h_2) \cdot (b_1 - b_2) + (b_1 \cdot h_1 - b_2 \cdot h_2)) \quad (16)$$

Since it can be seen from FIGS. 4A and 4B that $b_1 - b_2 > 0$ and $b_1 \cdot h_1 - b_2 \cdot h_2 > 0$, the above inequality (16) holds true. That is, the above-described assumption, $Z \leq 1$, is correct.

From the above, it is clear that the value of the ratio Y of the distance y between the axis $X_0$ and the oscillation axis X to the distance c between the axes $X_0$ and $X_2$ (=y/c) is within the range given by the following inequality (17).

$$0 \leq Y < 0.53 \quad (17)$$

This indicates that, when the distance from the axis $X_0$ to the axis $X_1$ (which corresponds to the distance c between the axes $X_0$ and $X_2$) in FIG. 4A shall be 1 and if another axis $X_3$ is located 0.53 away from the axis $X_0$ in the direction toward the axis $X_1$, the location of the center of oscillation at which the inertia J per unit torque attains its minimum value is within the range from the axes $X_0$ to $X_3$.

As described so far, the voice coil motor in the drive according to the present preferred embodiment has the feature that, when the distance between one (axis $X_2$) or another (axis $X_1$) side and the centroid axis (axis $X_0$) shall be 1, the distance between the center of oscillation (the oscillation axis X) and the axis $X_0$ is less than 0.53. The second preferred embodiment, as compared with the first preferred embodiment, can thus further reduce the value of the inertia J per unit torque and accordingly lessen the influence of the inertia of the coil 4, thus providing the oscillating part that executes high-speed oscillatory motion.

While the invention has been shown and described in detail, the foregoing description is in all aspects illustrative and not restrictive. It is therefore understood that numerous modifications and variations can be devised without departing from the scope of the invention.

What is claimed is:

1. A drive comprising:
   a coil of a rectangular shape;
   a magnet disposed opposite to one side of said coil; and
   a yoke holding said magnet and passing a magnetic line of force through said one side along with said magnet, wherein
   said coil passes a current, thereby producing thrust on said one side,
   said drive further comprising:
   an oscillating part holding said coil and having an oscillation axis that is parallel to said one side and is the center of oscillation; and
   an elastic body giving to said oscillating part an urging force against said thrust, wherein
   said coil has a centroid axis that is parallel to said one side and passes over a centroid of said rectangular shape of said coil,
   said coil has another side that is parallel and opposite to said one side, said another side does not have a magnet and a yoke that pass a magnetic line of force through said another side, and
   said oscillation axis is located between a coil face outside said another side and said centroid axis.

2. The drive according to claim 1, wherein
   assuming that the distance between said one or another side and said centroid axis is 1, the distance between said oscillation axis and said centroid axis is less than 0.53 in a direction from said centroid axis toward said another side.

* * * * *